United States Patent
Webb et al.

(10) Patent No.: US 9,456,438 B2
(45) Date of Patent: Sep. 27, 2016

(54) INTER-DEVICE COMMUNICATION IN A MACHINE TO MACHINE COMMUNICATION NETWORK

(75) Inventors: William Webb, Cambridge (GB); Robert Young, Cambridge (GB); James Collier, Cambridge (GB)

(73) Assignee: NEUL LTD., Cambridge (GB)

( * ) Notice: Subject to any disclaimer, the term of this patent is extended or adjusted under 35 U.S.C. 154(b) by 165 days.

(21) Appl. No.: 14/125,838

(22) PCT Filed: May 30, 2012

(86) PCT No.: PCT/EP2012/060169
§ 371 (c)(1),
(2), (4) Date: Jul. 3, 2014

(87) PCT Pub. No.: WO2012/171800
PCT Pub. Date: Dec. 20, 2012

(65) Prior Publication Data
US 2015/0080000 A1    Mar. 19, 2015

(30) Foreign Application Priority Data

Jun. 13, 2011 (GB) .................................... 1109874.6
Sep. 30, 2011 (GB) .................................... 1116910.9

(51) Int. Cl.
*H04W 72/04*    (2009.01)
*H04W 52/02*    (2009.01)
(Continued)

(52) U.S. Cl.
CPC ......... *H04W 72/04* (2013.01); *H04W 52/0219* (2013.01); *H04W 52/0238* (2013.01); *H04W 72/1226* (2013.01); *H04W 16/14* (2013.01); *H04W 84/042* (2013.01)

(58) Field of Classification Search
CPC ... H04W 4/006; H04W 4/005; H04W 84/18; H04W 72/04; H04W 16/14; H04W 84/042; H04W 52/0219; H04W 52/0238; H04W 72/1226; G01D 5/00; H04L 67/12
USPC ........ 455/870.02, 870.12, 870.3, 410, 412.1, 455/426.1, 450–454, 509–514, 34.1–34.2; 340/410, 412.1, 426.1, 450–454, 340/509–514, 34.1–34.2, 870.02, 870.12, 340/870.3
See application file for complete search history.

(56) References Cited

U.S. PATENT DOCUMENTS

| | | | |
|---|---|---|---|
| 5,748,104 A | * | 5/1998 | Argyroudis et al. .... 340/870.11 |
| 5,883,886 A | * | 3/1999 | Eaton ..................... G01D 4/004 340/7.21 |

(Continued)

FOREIGN PATENT DOCUMENTS

| | | |
|---|---|---|
| EP | 1850611 A1 | 10/2007 |
| WO | 0057382 A2 | 9/2000 |
| WO | 03079717 A2 | 9/2003 |

OTHER PUBLICATIONS

"TG4g Coexistence Assurance Document ; 15-10-0668-01-004g-tg4g-coexistence-assurance-document-first-draft", IEEE Draft, 15-10-0668-01-004G-TG4G-Coexistence-Assurance-Document-First-Draft, IEEE-SA, Piscataway, NJ, USA, vol. 802.19, Sep. 1, 2010, pp. 1-32, XP017636907.

Chin-Sean Sum et al., "Coexistence of homogeneous and heterogeneous systems for IEEE 802.15.4g smart utility networks", New Frontiers in Dynamic Spectrum Access Networks (DYSPAN), 2011 IEEE Symposium on IEEE, May 3, 2011, pp. 510-520, XP031953911.

(Continued)

*Primary Examiner* — Kamran Afshar
*Assistant Examiner* — Nicole Louis-Fils
(74) *Attorney, Agent, or Firm* — Slater Matsil, LLP

(57) ABSTRACT

A communication system comprising a base station and two or more terminals configured for communicating with the base station by means of a communications protocol, wherein: the communications protocol operates in a frequency band to which unlicensed access is permitted; and the terminals are configured for unattended operation with the base station.

17 Claims, 1 Drawing Sheet

Figure 1:
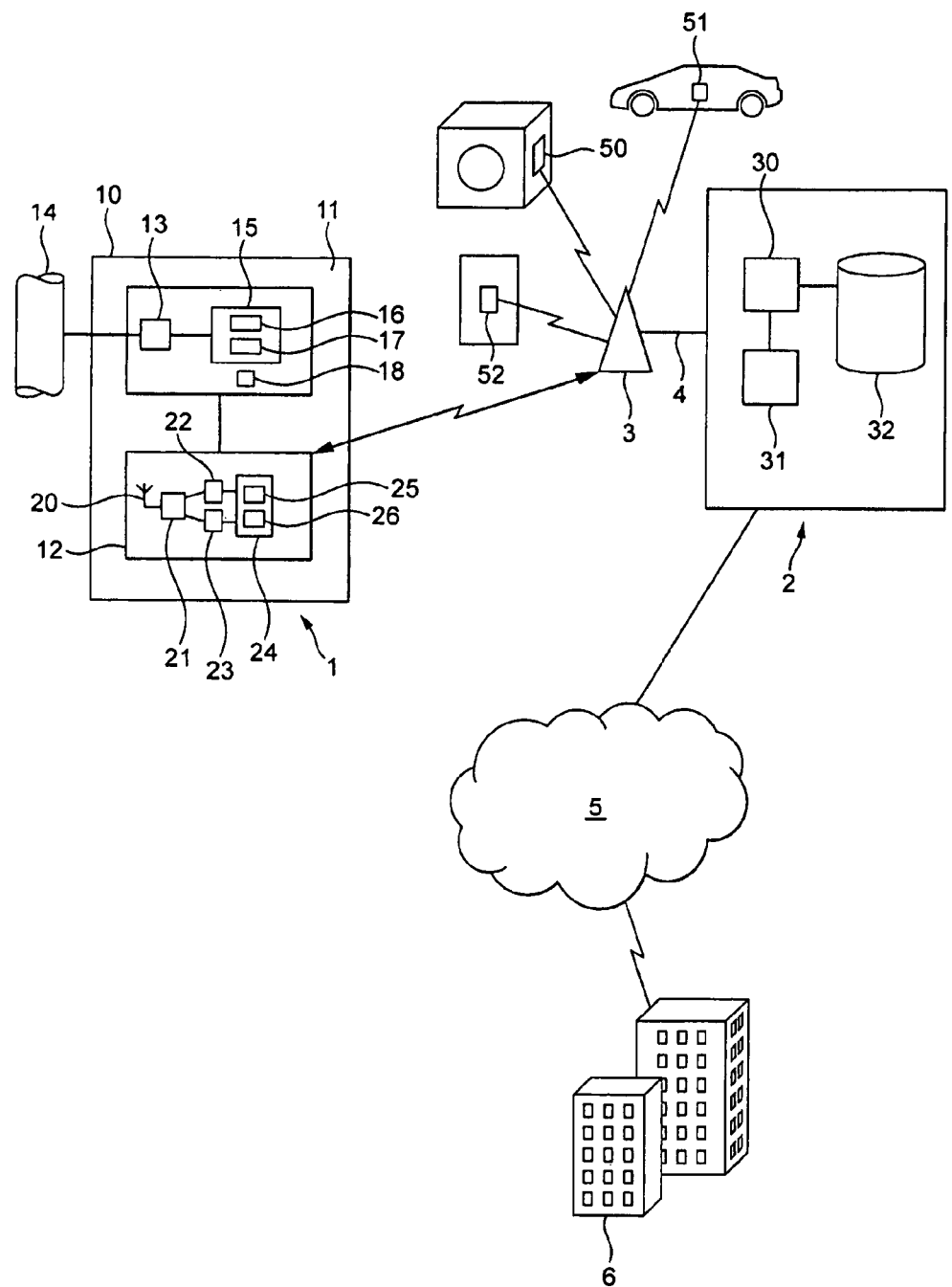

(51) Int. Cl.
*H04W 72/12* (2009.01)
*H04W 16/14* (2009.01)
*H04W 84/04* (2009.01)

(56) References Cited

U.S. PATENT DOCUMENTS

| | | | | |
|---|---|---|---|---|
| 5,914,672 | A * | 6/1999 | Glorioso et al. | 340/870.02 |
| 6,005,884 | A * | 12/1999 | Cook | H04W 88/085 370/338 |
| 6,340,928 | B1 | 1/2002 | McCurdy | |
| 7,697,492 | B2 * | 4/2010 | Petite | 370/338 |
| 2002/0094799 | A1 | 7/2002 | Elliott et al. | |
| 2002/0109607 | A1 * | 8/2002 | Cumeralto | H04B 1/713 340/870.02 |
| 2003/0034900 | A1 * | 2/2003 | Han | G01D 4/004 340/870.02 |
| 2003/0048199 | A1 * | 3/2003 | Zigdon | H04B 1/707 340/870.02 |
| 2007/0195899 | A1 * | 8/2007 | Bhushan | H04B 7/0452 375/260 |
| 2008/0219239 | A1 * | 9/2008 | Bell | H04L 12/4625 370/351 |
| 2009/0040057 | A1 * | 2/2009 | Keyghobad | H04L 12/2818 340/635 |
| 2009/0109056 | A1 * | 4/2009 | Tamarkin | G01D 4/004 340/870.02 |
| 2010/0309806 | A1 | 12/2010 | Wu et al. | |
| 2011/0090939 | A1 * | 4/2011 | Diener | H04L 1/0001 375/136 |
| 2011/0095903 | A1 * | 4/2011 | Gudlavenkatasiva | G01D 4/004 340/870.02 |
| 2013/0072232 | A1 * | 3/2013 | Lee | H04W 48/14 455/456.2 |

OTHER PUBLICATIONS

Zubair MD Fadullah et al., "Toward intelligent machine-to-machine communications in smart grid", IEEE Communications Magazine, IEEE Service Center, Piscataway, NJ, USA, vol. 49, No. 4, Apr. 1, 2011, pp. 60-65, XP011372659.

William Webb, "Weightless Technology an Overview", Mar. 28, 2012, pp. 1-16, XP55030536, retrieved from internet: http://www.weightless.org/documents/download/ee575c15ed123be7c9e119d52bc48d1d4f73162892123, retrieved Jun. 20, 2012.

ZTE: "On RAN enhancements for MTC in Rel-11", 3GPP Draft; R2-112862—Ran Enhancements for MTC in R11, 3rd Generation Partnership Project (3GPP), Mobile Competence Centre; f-06921; Sophia-Antipolis Cedex, France, vol. RAN WG2, No. Barcelona, Spain, 20110509, May 3, 2011, XP050495264.

"18-04-0056-00-0000f_Comments_to_TV_Band_NPRM ; 18-04-0056-00-0000f_Comments_to_TV_Band_NPRM", IEEE Draft, 18-04-0056-00-0000F_COMMENTS_TO_TV_BAND_NPRM, IEEE-SA, Piscataway, NJ, USA, vol. 802.18, Dec. 1, 2004, pp. 1-19, XP017644508.

Andrea Bartoli et al., "Low-Power Low-Rate Goes Long-Range: The Case for Secure and Cooperative Machine-to-Machine Communications", May 13, 2011, Networking 2011 Workshops, Springer Berlin Heidelberg, Berlin, Heidelberg, pp. 219-230, XP01963032.

WAVECOM Online Help 8.0, "Transmission Modes: PACTOR-II", downloaded at http://www.wavecom.ch/onlinehelp/WCODE/#!worddocuments/pactorii.htm, accessed Mar. 14, 2012.

* cited by examiner

INTER-DEVICE COMMUNICATION IN A MACHINE TO MACHINE COMMUNICATION NETWORK

This invention relates to communication between devices.

This application incorporates by reference the following applications filed by the applicant hereof on 13 Jun. 2011:

| Title | Application No. |
| --- | --- |
| Allocation of whitespace spectrum | UK Patent Application No. 1109830.8 |
| Antenna nulling | UK Patent Application No. 1109829.0 |
| Broadcast mechanism | UK Patent Application No. 1109836.5 |
| Allocating whitespace spectrum | UK Patent Application No. 1109854.8 |
| Channel bandwidth | UK Patent Application No. 1109840.7 |
| Transmission mode | UK Patent Application No. 1109837.3 |
| Interference mitigation | UK Patent Application No. 1109850.6 |
| Very long frame | UK Patent Application No. 1109848.0 |
| Acknowledgement mechanism | UK Patent Application No. 1109844.9 |
| Slot flexibility | UK Patent Application No. 1109863.9 |
| Frequency planning | UK Patent Application No. 1109853.0 |
| Signal acquisition from cold start | UK Patent Application No. 1109867.0 |

In the event of a conflict between the content of those applications and the description and claims set out below, the description and claims set out below take precedence.

The majority of communication devices are primarily intended to communicate data whilst they are being operated by a nearby user. For example, a typical telephone or personal computer is designed to allow a user who is holding, or is at least near to, the device to speak or type data into the device and to communicate that data to a user at another location. For this purpose the device is typically provided with a user interface that includes means for accepting data from a user and means for providing data to a user. The means for accepting data from a user could, for example, be a keypad, microphone or touch-screen. The means for providing data to a user could, for example, be a display, loudspeaker or an indicator light.

Some computers are designed for unattended operation. One example is a web server located in a server farm. Whilst this can if necessary be controlled by means of a local keypad and display, in normal operation administrative tasks are performed on the server by means of a communications link to a personal computer located elsewhere, and inputs from the user interface of that personal computer are transmitted over a network to the server. Similarly, when the web server is in a communication session with a client browser running on a remote personal computer, the data served by the web server is provided in response to inputs that the user of that remote personal computer provides to the personal computer.

In each of the instances described above, the communication links between the devices in question need to provide a reasonably low degree of latency so that the users will be satisfied with the responsiveness of the links. For example, when two users are communicating through their telephones, they expect to be able to hear each other's speech substantially in real time; or when a user is controlling or is in a web session with a web server he will expect to receive prompt responses from the server. If there is a long delay in communication, the user may become frustrated and can be expected to eventually close the link.

It is anticipated that there will be an increase in the number of devices that communicate automatically without a user being in attendance. For example, it has been forecast that in the future devices such as domestic appliances, motor vehicles and utility meters will commonly be capable of sending data to report on their operational state and receiving data such as upgraded operating software. It is widely predicted that the preferred way for these devices to communicate will be via the internet, with their initial access to the internet being over wireless link. The most common architecture that is proposed is for the device to be provided with a wireless transceiver which can access the internet by means of Wi-Fi or a cellular telephony network, and that the device will then communicate via that wireless network and then the internet with a remote server which is also connected to the internet and is configured to communicate with the device. It has also been proposed that internet access could be provided using protocols similar to Wi-Fi but operating in whitespace spectrum, and it is conceivable that these devices could in future access the internet in that way.

This architecture is convenient because it can make use of existing technology and because providing access to the server over the intranet is nowadays a natural, indeed almost instinctive, approach. However, it has a number of drawbacks.

First, it is relatively expensive to provide internet access over links of the types discussed above. In the case of Wi-Fi, the expense arises from its relatively short range, and the consequent need to provide an access point near to the device in question. The cost of enough access points, and the means to connect them to the internet, to allow devices to communicate from substantially any location even in an urban area would be very high. In the case of mobile telephony, data costs (the costs to a user of transferring a given amount of data) are high. No reliable rates are published for projected whitespace internet access, but given the high bandwidths and low latencies that the proponents of these networks anticipate they will be able to provide, it can be expected that they will also command a relatively high price.

A second problem with this architecture is that it is open to various forms of failure that would be undesirable to companies seeking to gather or distribute information with a high degree of reliability. For example, one potential use of the architecture would be to gather electricity consumption data from domestic electricity meters. Unscrupulous people might want to try to prevent their electricity meter from communicating with the internet in the hope that they would not then receive an electricity bill. They might do this by turning off their wi-fi access point, denying the meter a connection to the access point or implementing a jamming device that prevents the meter from accessing whatever wireless network it might be configured to use.

It would be desirable for there to be a way of providing automated devices with wireless access to a server in a way that at least partly addresses any of the above problems.

According to one aspect of the present invention there is provided a communication system comprising a base station and one or more terminals configured for communicating with the base station by means of a communications protocol, wherein: the communications protocol operates in a frequency band to which unlicensed access is permitted; and the terminals are configured for unattended operation with the base station.

According to a second aspect of the present invention there is provided a base station and/or a terminal configured for operation in accordance with the said communications protocol.

Each terminal may comprise a sensor for sensing physical data local to the terminal. Each terminal may be configured for automatically transmitting to the base station data gathered by the sensor. Each terminal may be configured for transmitting the information at pre-set times and/or in response to a request from the base station. Each terminal may comprise a memory for aggregating data sensed by the sensor over time. Each terminal may be configured for automatically transmitting to the base station the aggregated data.

Each terminal may be integrated with a utility meter. The sensor may be a sensor for sensing usage of a utility. Examples of utilities include any of water supply, electricity supply, fuel supply, waste disposal, usage of transport facilities, carriage of data and supply of media.

Each terminal could have no user interface input device by which data for transmission to the base station can be input. Each terminal may have no user input device for use during normal operation.

At least part of the frequency band may lie in the range from 450 MHz to 800 MHz. Conveniently, the terminal and/or the base station are capable of communicating over greater than half of that frequency band. The terminal and/or the base station may be capable of communicating in a way such that their usage of the frequency band is limited in accordance with data they have received from a frequency allocation entity. That frequency allocation entity could be a white-space database.

The communications protocol may be a spread-spectrum communications protocol, for example a frequency hopping communications protocol.

The protocol may have a minimum instantaneous data rate and the minimum instantaneous data rate may be 20 Kbits per second or less, for example 20 Kbits per second.

The communication system may comprise a server coupled to the base station by means of a data link. The data link may be a dedicated data link, or may be a logical data link over a publically-accessible network. In the latter case, the base station may be configured so as to isolate the terminals from the publically-accessible network. In that situation, although the base station is connected to the publically-accessible network, it does not provide the terminals with any routing service over the network. Hence, whilst traffic data sent by the terminals can be forwarded by the base station to the server, the terminals are not provided with access to the network whereby they can address multiple entities over the network, or even address the server itself. The base station may be configured to pass traffic data received from the terminals to the server. Conveniently, the server has access to a database and the server is configured to store traffic data received from the terminals in the database together with data identifying the source(s) of the data, e.g. an identity of the terminal that was the source of the data.

The base station and the terminal(s) may collectively implement a scheduling algorithm whereby communications from the terminal(s) to the base station can be automatically scheduled, and the scheduling algorithm is such as to be capable of scheduling individual communications more than two hours in advance, more than six hours in advance, more than a day in advance or more than two days in advance.

Each terminal may be capable of receiving and acting on configuration data received from the base station. That configuration data may be one of operating software and media data.

The communications protocol may support a frame length longer than one second.

The terminals may be configured to communicate directly with the base station.

The terminals may be configured to communicate by means of the communication protocol with the base station only.

The communication system may be configured such that all wireless communications either originate or terminate at the base station.

The communication system may be configured for long range communications.

The terminals may be located more than 100 m from the base station.

The present invention will now be described by way of example with reference to the accompanying drawing. In the drawing:

FIG. 1 is a schematic diagram of a wireless network.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

FIG. 1 shows a wireless network for allowing a utility meter 1 to communicate with a server 2. The meter 1 comprises a housing 10 containing a metering device 11 and a wireless transceiver 12.

The metering device has a sensor 13 which is coupled to a conduit 14 through which the utility is supplied. The sensor is capable of sensing the amount of usage, for example the amount of water, gas or electricity flowing through the conduit, and generating an output which indicates that amount. The output of the sensor is passed to an accumulator 15 which accumulates the amount of usage over time. The accumulator stores a value representing the total amount of usage since it was last reset. In one example, the accumulator could be embodied by a non-volatile memory 16 which operates under the control of a processor 17. The processor 17 executes a program stored in a non-volatile memory 18 which causes it to add the current usage value supplied by the sensor to the total usage value stored by the non-volatile memory 16 to form a new total usage value, and to then store the new total usage value in the memory 16, replacing the old value.

The transceiver has an antenna 20, a radio frequency (RF) front end 21, analogue to digital converter 22, digital to analogue converter 23, and a baseband section 24. The baseband section comprises a processor 25 and a non-volatile memory 26 which stores program code for execution by the processor 25. In operation for reception, radio frequency signals from the antenna 20 are amplified, filtered and down-converted in the RF front end 21, digitised by the A-to-D converter 22 and then passed to the baseband section for processing in accordance with the stored program code to extract useful data from them. In operation for transmission, data for transmission—whether traffic data or control data—is formed by the processor 25 in accordance with the stored program code, converted to analogue form by the D-to-A converter 23, up-converted and amplified by the RF front end 21 and then passed to the antenna for transmission. The operation of the RF front end and the A-to-D converter are controllable by the processor in accordance with the stored program code so that they can operate for reception with the appropriate parameters: for example in a desired frequency band or at a desired sampling rate.

The processor 25 of the transceiver is coupled to the processor 17 of the metering device. When a meter reading is to be transmitted, the processor 17 can pass the value stored in memory 16 to the processor 25, and the processor 25 can then transmit that value.

The details of the protocol that the transceiver 12 uses for communication will be described below, but using that protocol the transceiver 12 can communicate with a second transceiver 3. The architecture of the second transceiver 3 is not shown in detail in FIG. 1, but it could be analogous to that of transceiver 12. The second transceiver is coupled to the server 2 over a data link 4. The data link 4 could be a physically private data link, or a physically public data link such as a link over the internet. In the latter case it would be desirable for the link to be secured by a mechanism such as encryption and/or authentication to prevent spoof data from being injected into the server. The second transceiver 3 can communicate wirelessly with multiple transceivers in a range of different devices. For example, FIG. 1 shows a transceiver 50 in a washing machine, a transceiver 51 in a car and a transceiver 52 in a meter for a second utility network.

The server 2 comprises a processor 30, a program data store 31 and a database 32. The program data store holds program data for execution by the processor. The database stores data relating to the activities of the server, as will be discussed in more detail below. The server is connected to a network 5, which could be the internet, and over that network the server can communicate with a range of corporate users indicated at 6. A security protocol is implemented by the server so that only authorised users can access it over the network 5. An authorised user can access the server 2 and store data in or read data from the database 32.

In one example of how the system operates, when the meter 1 transmits a usage value to the second transceiver 3 the second transceiver transmits that value to the server 2, and the server stores the value in an appropriate part of the database 32. Subsequently the utility company who provides the utility that the meter 1 is metering can access the server 2 over network 5, interrogate the database 32, read the stored value and then use it to charge a customer for the utility usage.

The same server can provide other services for other corporate users. For example, a corporate user who manufactures domestic appliances might want to upgrade certain washing machines. He could access the server 2 and store in the database new operating software that is to be downloaded to the washing machines and an identification of the machines to which it is to be downloaded. The server 2 would then transmit the operating software via the second transceiver 3 to cooperating transceivers of those machines (e.g. transceiver 50). Thus, the server 2 is operable to accept traffic data from remote transceivers and store that data in the database 32 (as in the case of utility meter readings) and also to transmit traffic data stored in the database 32 to remote transceivers (as in the case of a operating software upload).

The timings of these transmissions may depend on a number of factors. In the case of traffic data passing to the server from a remote transceiver, that remote transceiver or a device local to it, such as the processor 17 of metering device 11, may be pre-programmed to attempt to transmit the data according to a pre-programmed schedule: for example at pre-set intervals of time or when pre-set amounts of a utility have been consumed. Second, the server may be programmed to interrogate a remote transceiver to request traffic data from it in accordance with a schedule stored in the database 32. In this way, a corporate user can dictate the timing at which data is requested. Thirdly, for reasons that will be described below, the transmission of the traffic data at the designated time might not be successful. In that situation the data can be re-transmitted later. In the case of traffic data passing from the server to a remote transceiver, the server may be configured via the database 32 to transmit the data at a time desired by the corporate user, or the data could be transmitted when requested by a remote transceiver.

Thus the server 2 operates with the database 32 in a number of ways.

1. The server can be configured to store in the database 32 traffic information received from remote terminals. That information can then be obtained by corporate users through interrogating the database. Conveniently, each item of data or each group of data that is stored in this way is tagged so that it can be processed effectively by the corporate user. It could be tagged with the time at which it was generated, the time when it was uploaded or the time when it was stored in the database. It could be tagged with an identifier for the transceiver from which it was received, so that it can be attributed to the appropriate end-user.

2. A corporate user can store in the database 32: (a) information that is to be transmitted to remote terminals and (b) information defining how and when that data is to be transmitted to remote terminals. The latter data can, for example, include an identification of when the data is to be transmitted, an identification of the priority with which it is to be transmitted, and an identification of the terminals to which it is to be transmitted. The server can be configured to interrogate the database and perform the actions designated by the data stored in the database by a corporate user. For example, it can be configured to transmit data to only those terminals designated in the database in relation to that data, to transmit the data at the time(s) designated in the database in relation to that data and/or to transmit with the priority designated in the database in relation to that data.

The protocol used over the wireless link between the transceivers will now be described. Each terminal in the system is programmed to operate in accordance with the protocol described below. However, it will be appreciated that other protocols could be used.

The present protocol operates in so-called whitespace: a part of the spectrum that is made available for unlicensed or opportunistic access. Conveniently, that may be in the UHF TV band and spans all or part of the range from 450 MHz to 800 MHz, depending on the country. A large amount of spectrum has been made available for unlicensed wireless systems in this frequency range. A problem with operating in whitespace is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications, as will be described in more detail below.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in the whitespace must reference a database that determines which channels may be used in any given location. This is intended to avoid interference with the TV transmissions and certain other incumbent systems such as wireless microphones.

Machine-to-machine communications are well-matched to the limitations of operating in whitespace, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions.

Preferably the system is configured to operate in accordance with a many-to-one communication model. Transceiver 3 may be configured to communicate with multiple other transceivers (1, 50, 51, 52), but each of those other transceivers may be configured to only communicate with transceiver 3 (or a transceiver performing a similar role to transceiver 3 in another cell) and not with each other. Transceiver 3 may be configured to act as a base station. Transceivers 1, 50, 51, 52 may be configured to act as wireless terminals. All wireless communications in the network preferably either originate or terminate at a base station, so that the base stations act as single aggregation point for all wireless communications. The terminals just communicate directly with the base stations. They do not communicate with each other or via any third party device. This model is a good match for machine-to-machine communications as it enables the majority of the intelligence to reside in the core network so that terminals can be relatively simple, low power devices. Also infrastructure is simplified and billing is rendered more straightforward.

Preferably the system is configured to operate in accordance with a protocol that is adapted for long range wireless communications. Long range communications are generally considered to be those where the distance between transceivers is 100 m or more. Preferably the system is able to accommodate communications between transceivers that are up to 10 km apart. The ability to communicate over long distances is a necessary requirement if the system is to provide a machine-to-machine network offering country-wide coverage within realistic infrastructure constraints. Existing proposals for whitespace communication systems typically make use of protocols that are adapted for short range communications (e.g. communications spanning less than 100 m). The system may be configured to operate in accordance with a proprietary protocol that is simultaneously adapted for long range communications and communications via whitespace. An example of a suitable protocol is Weightless; however, any suitable communications protocol might be used.

The system operates according to a frequency hopping mechanism. In this mechanism the transceiver 3, which is acting as a base station, determines a suitable list of frequencies for use in the frequency hopping sequence. The base station then determines a sequence using those frequencies. The base station communicates the frequency hopping sequence to the other terminals in the cell. If the base station determines that one or more of the terminals is subject to interference on a frequency hopping sequence it allocates slots to future communications with those one or more terminals to avoid the interfered frequency.

The frequency hopping sequence may be determined by the base station and then communicated by the base station to the other terminals so that the other terminals know in advance which frequency they should listen to and/or transmit on. The base station may select the frequencies to be used for frequency hopping based upon information from the whitespace database on the available channels and associated power levels. The base station may also reject channels found to suffer poor propagation or throughput. Finally, the base station may reject any channels on which the presence of another user, operating outside of the wireless network, has been detected. The base station may use this combination of considerations to produce a final list of frequencies available to it for frequency hopping. This final list may be generated in dependence on factors that affect the cell as a whole and may not be influenced by localised interference that may affect only a few terminals in the cell.

Having generated a list of frequencies that are suitable for being used in the cell, the base station may be arranged to next determine in what order those frequencies should be used by the hopping sequence. The hopping sequence may be determined with reference to the sequences being used by neighbouring cells, in order to minimise interference suffered by terminals located in the boundary regions between cells. Neighbouring base stations are likely to have similar whitespace channel assignments. (As the distance between base stations increases, the assignments tend to change as the base stations are located in different TV service areas.) The hopping sequences and start points may be uncoordinated, so that all base stations randomly select hopping patterns and accept that there will be occasions where interference occurs between base stations. They may be self-coordinated, so that base stations listen to the hopping sequences of nearby base stations and select patterns that will minimise interference. Another option is for central coordination, so that central planning is used to assign hopping sequences that will minimise interference. Any of these options might be adopted, with the option of base stations and/or the network as a whole changing between them according to what is optimal at any particular point in time.

A preferred option for neighbouring base stations that use the same (or substantially the same) frequencies, is for those frequencies simply to be used in ascending or descending order. The offset that each base station applies to its own ascending or descending sequence (so that neighbouring base stations start their ascending or descending sequences at different frequencies to avoid direct clashes as far as possible) may be determined centrally. Where there is a direct clash, some messages may be lost.

Preferably the frequency hopping sequence is communicated to each terminal in the cell once it has been determined. This communication is suitably achieved by the base station including information defining the sequence in each frame it transmits, so that a terminal can obtain the frequency hopping sequence by listening to only one frame.

On the uplink, slots may be numbered from 0 to n on a first FDMA channel, then on the subsequent FDMA channel and so on. A terminal can determine how many slots there are each channel from the length of the frame available for the uplink (that remaining after completion of the downlink) divided by the length of each slot. If a terminal has data requiring multiple slots it would normally be given these consecutively on the same carrier as this both simplifies the terminal transmission and minimises the control information required to describe the slot location. However, it is possible to give the terminal multiple allocations on different carriers (so long as they are not simultaneous) to achieve frequency hopping on the uplink.

The base station may determine that one or more terminals is suffering from interference in dependence on information received from those terminals, in dependence on its own observations, or in dependence on a combination of these factors. The base station may independently deduce that a terminal is suffering from interference if it does not receive an acknowledgment for a message sent to it on a particular frequency in the hopping sequence. The base station may also deduce that a terminal is suffering from interference on one or more frequencies in dependence on information that is sent to it by the terminal. The terminal may send a message to the base station especially to inform it of a failure to receive one or more messages from the base station. The terminal might include the failure information as part of a control message. The control message may be a message in which the terminal informs the base station of the quality of the downlink (comprising, for example, the signal strength and/or bit error rate observed on a particular frequency on the downlink). The terminal may be configured to regularly monitor the quality of the downlink and send the control message on a regular, periodic basis. Alternatively, the terminal may be configured to send the control message on being instructed to do so by the base station. The base station may determine that the terminal is subject to interference on a particular frequency in dependence on the quality of the downlink.

If the base station determines that a number of terminals greater than a predetermined number are suffering from interference on a particular frequency, the base station may be configured to determine that the interference on that frequency is not localised. The base station may be configured to remove the interfered frequency from the frequency hopping sequence for a time, since the interference is affecting a significant number of terminals in the cell. If, however, the interference is determined to relate to a relatively small number of terminals (lower than the predetermined number), the base station may be configured to determine that those terminals are suffering from localised interference and that, consequently, there is no need to remove the interfered frequency from the hopping sequence for the cell as a whole.

If the base station determines that a terminal is subject to localised interference on a particular frequency, it may schedule future communications with that terminal to avoid the problematic frequency. If those future communications have yet to be scheduled, the base station can simply allocate future communications with the terminal to time slots within the frequency hopping sequence that are on frequencies other than the interfered frequency.

The base station may be configured to communicate with one or more terminals in the cell at regular, predetermined intervals. Scheduling communications in this way may be advantageous in machine-to-machine networks, in which the terminals may be devices having small batteries. By scheduling communications at regular, predetermined intervals, terminals can enter a sleep mode between communications and only wake-up when a communication is expected. If one of these regular communications is scheduled to occur on the interfered frequency, the scheduled communication may be skipped.

If a scheduled communication is to be skipped, the base station may indicate this to the terminal in advance. Alternatively, the base station and the terminal may independently determine that the next scheduled slot should be skipped without exchanging messages to confirm this. Such independent determinations may be made, on the terminal's side, by it not having successfully received a message from the base station on a particular frequency and, on the base station's side, by it not having received an acknowledgement for the message transmitted on that frequency. As causes other than interference may be responsible for a message being lost, the terminal and base station may be configured only to make such an independent determination of there being localised interference after more than one message on a particular frequency has failed.

A drawback with having the terminal and base station independently determine to skip a scheduled communication is that the terminal and the base station might 'guess' differently as to whether or not a scheduled communication should be skipped. However, in a machine-to-machine network this is not necessarily problematic. Any missed data can simply be re-sent by the base station and machines are generally tolerant of delays.

The base station may be configured to preferentially schedule communications to avoid the interfered frequency for a predetermined length of time before reinstating that frequency in communications with the terminal. The base station may be arranged to indicate this predetermined length of time to the terminal. If the base station and the terminal are configured to independently determine whether or not to skip a communication, both the base station and the terminal may be configured to skip communications scheduled to occur on the interfered frequency for the predetermined length of time.

A retransmission mechanism is built into the protocol. Data is transmitted by way of packets or other data units which include a block such as a header which contains error check data. The error check data could be data generated by a cyclic redundancy check or other algorithm carried out over the content of the data unit as transmitted, which allows a recipient of the data unit to identify whether it has been correctly received. The protocol is such that a device receiving a data unit transmits back to the transmitter of the data unit an acknowledgement for that data unit if the data unit has been successfully received. The transmitter of the original data unit re-transmits the data unit from time to time until it is acknowledged.

The data rate in the protocol can be variable, but the protocol is capable of supporting a particularly low minimum data rate. For example, the minimum instantaneous data rate (over the air) can be 20 Kbits per second or less, for example 10 Kbits per second. This would be inadequate for most applications, but in the case of machine-to-machine communications a data rate of this type is adequate for many purposes and can improve tolerance to interferers. To accommodate such a data rate, the protocol preferably supports data frames of duration 1 second or longer.

Whitespace communications are subject to power restrictions so long range communications are not usually possible in this part of the spectrum. The protocol preferably provides for the range to be increased via spreading, suitably by means of spreading codes. A wide range of spreading factors/codes are available to tailor the data rate to the propagation conditions (see below). The use of spreading does reduce data rates; however, the large amount of bandwidth available in whitespace may render this acceptable, particularly with mechanisms such as frequency hopping making efficient use of the available bandwidth.

Spreading codes also provide an additional tool to overcome the absence of frequency planning between base stations. Neighbouring base stations may be allocated different subsets of the same codes such that when they do transmit on the same frequency there is still some possibility for the terminals to decode the signal intended for them. The worst interference is likely to occur at a cell edge where the interfering signal can be almost as strong as the wanted signal. At a cell edge it is likely that the SNR will be low. Therefore, the base station may be configured to select a higher spreading factor for communications with terminals it determines to be located near the cell boundary. This makes it possible to make use of code diversity.

Spreading codes could be applied on a TDMA basis with different codes being applied to each terminal according to its SNR. The selection of spreading code is made by the base station according to channel quality information returned from the terminal.

The spreading codes are of length $2^N-1$ and are defined as follows:

| Spreading factor | Code type | Number of codes |
| --- | --- | --- |
| 15 | Kasami | 4 |
| 31 | Gold | 32 |
| 63 | Gold | 64 |
| 127 | Gold | 128 |
| 255 | Kasami | 16 |
| 511 | Gold | 512 |
| 1023 | Gold | 1024 |

These code sets have very good auto-correlation and cross-correlation properties, making them suitable for use with channels that have severe multipath and for use with multi-code spreading to convey multiple bits per symbol. As shown in the table above, there are fewer such codes for Kasami code sets than for Gold code sets, but the Gold codes are not available for all spreading factors.

The spreading factor used by a base station depends on the required processing gain to provide the necessary range for that cell. Some control fields within the MAC frame are preferably sent with the maximum spreading factor to ensure that all terminals can receive the control information (as discussed above). However, it is inefficient for a base station to use a spreading factor that is unnecessarily high and, therefore, for other portions of the frame the base station preferably selects a spreading factor that is tailored to the reception capabilities of the particular terminal(s) for whom that portion of the frame is intended.

The data may be initially encoded using BPSK (using 1 bit per symbol) or QPSK (using 2 bits per symbol). The selected spreading code may be applied separately to the I and Q components of each symbol. BPSK can be used to provide some extra processing gain when operating at the maximum supported spreading factor, in preference to doubling the spreading factor. In other cases, better performance may be achieved by using QPSK with a spreading factor that is twice as large to achieve the same overall data rate.

The base station may opt to use multiple codes rather than just a single code. For multi-code spreading there are an additional n bits per symbol encoded using a 1 in $2^n$ code selection from the available codes, in addition to the 2 encoded bits per symbol for the QPSK constellation. The selected codes may be used to separately modulate the I and Q data, as before.

The use of multiple codes to convey additional bits per symbol improves the $E_b/N_0$ performance of the modulation. Effectively, it is a form of coding. The improvement may be diluted by the addition of FEC (forward error correction coding) because the coding gain of FEC is lower for multi-code modulation (because the underlying modulation is already more efficient). Nonetheless, there are significant $E_b/N_0$ benefits in using a 1 in 4 code selection, such that a total of 4 bits are transmitted per symbol including the 2 bits for the QPSK modulation. It also allows the use of larger spreading factors for a given data rate, which improves the performance of a Rake receiver by allowing the length of the spreading codes to exceed the delay of all significant multipath components. The drawback is that multiple correlators are required in the receiver, but for a 1 in 4 code selection this is not a big overhead given that chip timing is known at this stage of the decoding process.

Carrier phase tracking may be required, likewise a Rake receiver and Rake finger tracking (i.e. channel impulse response tracking). This means that it can be suitable for use with channels that are varying a rate that is less than roughly $\frac{1}{10}^{th}$ of the symbol rate.

The spreading gain in the transmission could be used in order to be able to receive a signal in poor SNR conditions. This method also benefits from Rake equalisation as widely used in CDMA systems such as 3G. Rake reception convolves the received signal with the spreading code to determine the timing, phase and magnitude of each path. The receiver can use this knowledge to construct an equaliser.

Further range extension may be provided for situations in which the SNR is extremely low. This might be suitable, for example, for reading energy meters located in basements or remote dwellings.

The simple modulation scheme NC OFK could be used. Under this modulation scheme the receiver does not need to maintain carrier lock, but simply looks at the difference between consecutive symbols (rather than their absolute values). This allows operation at very low SNR levels, albeit at relatively low data rates and with some penalties in BER as a result of the use of differential coding.

The spreading code may be used directly to form the I and Q signals, without any additional BPSK or QPSK modulation. A convenient implementation is simply to apply the same modulator as discussed above, but either to fix the phase at a single QPSK constellation point, for example (1+j), or to fix the phase at a single BPSK constellation point, for example (1+0j).

Since there is no phase modulation to encode data bits, all information is conveyed using code selection. So to transmit n bits per symbol, a 1 in $2^n$ code selection can be used for each symbol. Therefore, a minimum of 2 codes should be used, in order to convey 1 bit per symbol. There are significant $E_b/N_0$ benefits in using larger values of n. Typical values of n are 2 and 4, corresponding to a 1 in 4 or a 1 in 16 code selection respectively.

Since there is no phase information, the receiver does not need to track carrier phase and can instead apply a magnitude operation to the output of each correlator to determine the most likely transmitted code. In other words, this kind of modulation supports a fully non-coherent receiver. This means that the modulation is robust to channels whose phase is varying at a rate that is approaching the symbol rate, and so is suitable for use with very high spreading factors. In the case that the channel phase is varying faster than the symbol rate, it is still possible to demodulate the signal by partitioning the correlator integration over each symbol period into a number of shorter coherent integrations which are then summed incoherently. Inevitably, there is an $E_b/N_0$ performance penalty in doing this, but it does allow very high processing gains to be used with channels that are not stationary.

Making use of spreading codes to extend the range at the expense of data rate allows the possibility of neighbouring cells using orthogonal spreading codes, such that if inter-cell interference occurs on one or more frequencies it may still be possible for some information to be received by the terminals. For simplicity, all base stations may make use of the same code sequences but with different offsets. The assignment of the offset is preferably made such that neighbouring base stations have assignments that provide the maximum orthogonality. In this way code planning does not change according to assigned frequencies and so only needs to be altered when new base stations are added to the network. For example, if the terminal is operating at a spreading factor of 63, then there are 64 available offsets, of which each base station will typically use a subset of 4 (assuming a 1 in 4 code selection is being used to convey 2 bits per symbol). Therefore, in this example, different code subsets can be allocated to up to 16 neighbouring base stations.

An alternative approach is to use different chip-rate scrambling sequences for each base station. This approach may result in a lower level of interference suppression than selecting different code subsets from the available Gold codes, because the Gold codes have optimum cross-correlation properties.

The protocol described above has a number of features that make it especially suitable for use with the architecture of FIG. 1.

First, in the architecture of FIG. 1 at least some of the remote transceivers 1, 50, 51 52 etc. are associated with devices that can tolerate relatively high latencies in the transfer of data from them, and the protocol is capable of sustaining data transfer at high latencies. For example, it might be acceptable if a meter reading from a utility meter were to take 30 minutes, or even a week or more to be successfully transmitted from the meter to the server. The uploading of data such as meter readings can therefore be done with, if necessary, many failed transmission attempts and/or a very low data rate. This approach would be entirely inappropriate for conventional data or voice transmissions. Devices that can tolerate latencies on this level for uploads from them typically have any one or more of the following characteristics:

a. No user interface for input of the data to be transmitted from the device. For example, whilst the data gathered by a utility meter is influenced by the consumer's actions which vary his usage of electricity, the utility meter itself typically has no user interface by which the amount of energy consumed can be input; instead it gathers that data automatically.

b. Means for automatically gathering the data to be transmitted from the device. Those means may typically be a sensor, such as an ammeter, a temperature sensor, a humidity sensor, a pressure sensor or any other type of sensor, typically one for sensing a physical and/or environmental parameter.

c. Being configured for unattended operation for data gathering and transmission.

d. Being capable of logging substantially unlimited amounts of the data they are configured to gather. For example, a typical electricity meter could operate for many years before there was a potential overflow in the value stored representing the electricity usage.

Second, in the architecture of FIG. 1 at least some of the remote transceivers 1, 50, 51 52 etc. are associated with devices that can tolerate relatively high latencies in the transfer of data to them, and again the protocol is capable of sustaining data transfer at high latencies. For example, it might be acceptable if the operating software of a washing machine were not updated for a month or more. The downloading of data such as operating software can therefore be done with, if necessary, many failed transmission attempts and/or a very low data rate. Transmission attempts might fail because of corrupted data (e.g. due to interference or jamming), but if enough retransmission attempts are made in a well designed system, especially one that employs spread spectrum techniques and therefore provides resistance to jamming at specific fixed frequencies, it can be expected that there is a reasonable probability that at some point sufficient of the transmission will be successful that the data will be conveyed correctly. This approach would be entirely inappropriate for conventional data or voice transmissions. Devices that can tolerate latencies on this level for downloads to them typically have any one or more of the following characteristics:

a. No user interface for input of data of the class to be downloaded to the device. For example, whilst a washing machine typically has a user interface comprising a keypad, the washing machine is configured to accept data from that keypad only to configure it for operation and potentially to perform a limited set of service actions, not to enter lines of operating software code.

b. Means for automatically actioning data of the class downloaded to the device. Thus when the operating software is received at the device it may be automatically authenticated and/or automatically installed.

c. Being configured to provide substantially full functionality irrespective of whether it can communicate by means of its transceiver. For instance the primary function of a washing machine is washing clothes. Whilst the machine might be improved if it were able to receive new operating software, it would still be expected to be substantially fully functional without any enhancement provided by that operating software.

Third, by virtue of its operation in a wide frequency band of spectrum, and its use of spread-spectrum techniques, when taken together with devices' tolerance for high latencies the protocol provides significant resistance to interference and jamming. Many repeated transmission attempts might fail because of corrupted data, but if enough retransmission attempts are made in a spread spectrum system of the type described above it can be expected that there is a reasonable probability that at some point sufficient of the transmission will be successful that the data will be conveyed correctly. Similarly, given sufficient time for retransmissions the system can permit data to be successfully transmitted to and/or from devices located in enclosed locations. This is especially relevant for devices that are intended for unattended operation since they are often located in an area of a building that is difficult to access, since that space is not suitable for items that will be frequently handled. Some of those locations (e.g. roof voids) can be expected to be good for communication, but others (e.g. cellars, riser cabinets, internal cupboards, floor voids) can be expected to impose a high level of attenuation on signals to and from a device located there.

Fourth, by operating in the frequency spectrum identified above, the system can be expected to offer relatively long range communications and relatively good penetration of buildings. This allows a lower power to be used and/or a greater maximum distance between transceivers to be supported. Lower power consumption results in energy savings and increased battery life when a transceiver is battery powered. Greater maximum distance between transceivers means that fewer of the second transceivers 3 need to be deployed in order to provide effective coverage to an area. Multiple transceivers 3 could be coupled to a single server 2.

In the description above the examples of uploading operating software and downloading information indicative of automatically sensed physical data have been described. Some alternative mechanisms in which the system may be used include transmitting media to a media reader or terminal: for example transmitting magazine information to a portable reader device or transmitting flight information to an airport display screen; uploading usage information from a media player such as a games console or set-top box to allow charging for the usage of media on that device; uploading status information from a device, for example information indicating whether a vehicle needs to be serviced and fault code information indicating the nature of faults on the vehicle; and downloading map information to a vehicle for updating the vehicle's navigation system.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A communication system comprising:
   a base station having a transmitter; and
   one or more terminals each having a receiver and being configured for wirelessly receiving communications through the respective receiver from the transmitter of the base station when the transmitter is greater than 100 meters away from the respective receiver, and wherein the communications are transmitted using a communications protocol that is a spread spectrum, frequency hopping Weightless communications protocol;
   wherein the communications protocol operates in a frequency band to which unlicensed access is permitted;
   wherein the base station is configured to determine channels that are in whitespace of the frequency band and that are selected as available in a location of the base station and determine a frequency hopping sequence using the channels;
   wherein the terminals are further configured for unattended operation and unattended, automated communication with the base station;
   wherein the base station is further configured to determine whether the one or more terminals are suffering from interference on the channels of the frequency hopping sequence, and in response to determining that a number of interfered terminals is greater than a predetermined threshold are, remove an interfered channel from the frequency hopping sequence; and
   wherein the base station is further configured to, in response to determining that the number of interfered terminals is less than or equal to the predetermined threshold, send a communication to at least one of the interfered terminals to modify a subsequent scheduled communication with the respective interfered terminal, wherein modifying the subsequent scheduled communications comprises at least one of allocating future communications with the respective one of the interfered terminals to time slots within the frequency hopping sequence that belong to a channel other than the interfered channel, or indicating, in advance, to the one of the interfered terminals that a future communication should be skipped.

2. The communication system as claimed in claim 1, wherein each terminal comprises a sensor for sensing physical data local to the terminal, and is configured for automatically transmitting, to the base station, data gathered by the sensor.

3. The communication system as claimed in claim 2, wherein each terminal comprises a memory for aggregating data sensed by the sensor over time, and is configured for automatically transmitting to the base station the aggregated data.

4. The communication system as claimed in claim 2, wherein each terminals is integrated with a utility meter.

5. The communication system as claimed in claim 1, wherein at least part of the frequency band lies in the range from 450 MHz to 800 MHz.

6. The communication system as claimed in claim 1, wherein the protocol has a minimum instantaneous data rate that is 20 kbits per second or less.

7. The communication system as claimed in claim 1, comprising a server coupled to the base station by means of a dedicated data link.

8. The communication system as claimed in claim 7, wherein the data link is a logical data link over a publically-accessible network and the base station is configured to isolate the terminals from the publically-accessible network.

9. The communication system as claimed in claim 7, wherein the server has access to a database and the server is configured to store traffic data received from the terminals in the database together with data identifying the source(s) of the data.

10. The communication system as claimed in claim 1, wherein the base station and the terminal(s) collectively implement a scheduling algorithm whereby communications from the terminal(s) to the base station can be automatically scheduled, and the scheduling algorithm is capable of scheduling individual communications more than six hours in advance.

11. The communication system as claimed in claim 1, wherein each terminal is configured to receive and act on configuration data received from the base station, wherein the configuration data is one of operating software and media data.

12. The communication system as claimed in claim 1, wherein the communications protocol supports a frame length longer than one second.

13. The communication system as claimed in claim 1, wherein the communication system is configured for long range communications where a transmission distance is 100 meters of greater.

14. A base station, comprising:
    a transmitter;
    a processor connected to the transmitter; and
    a non-transitory computer readable medium connected to the processor and having stored thereon instructions that, when executed by the processor, cause the processor to:
       determine available channels, in whitespace of a frequency band in which unlicensed access is permitted, that are available for use in a location of the base station, and determine a frequency hopping sequence using the available channels;
       transmit the frequency hopping sequence to terminals more than 100 meters away from the transmitter;
       communicate, wirelessly through the transmitter and using a communications protocol, with the terminals;
       determine whether one or more of the terminals are suffering from interference on the channels of the frequency hopping sequence, and in response to determining that a number of interfered terminals is greater than a predetermined threshold, remove an interfered channel from the frequency hopping sequence; and send a communication to at least one of the interfered terminals to modify a subsequent scheduled communication with the respective interfered terminals in response to determining that the number of interfered terminals is less than or equal to the predetermined threshold, wherein modifying the subsequent scheduled communications comprises at least one of allocating future communications with the respective one of the interfered terminals to time slots within the frequency hopping sequence that belong to a channel other than the interfered channel, or indicating, in advance, to the one of the interfered terminals that a future communication should be skipped;

wherein the communications protocol is a frequency hopping spread spectrum Weightless communications protocol having a variable data rate.

15. The base station of claim 14, wherein the instructions that cause the processor to determine the available channels further comprises instructions that cause the processor to query a whitespace database to determine the available channels according to the location of the base station;

wherein the non-transitory computer readable medium further has stored thereon instructions that, when executed by the processor, cause the processor to determine the frequency hopping sequence from the available channels and according to at least one of a power level associated with each of the available channels, detection of use of each of the available channels and channel quality of each of the available channels.

16. A method, comprising:

determining available channels, in whitespace of a frequency band in which unlicensed access is permitted, that are available for use in a location of a base station that is configured to wirelessly communicate with terminals more than 100 meters away from the base station, using a communications protocol, and at regular, predetermined intervals, wherein the communications protocol is a frequency hopping spread spectrum Weightless communications protocol having a variable data rate;

transmitting a set of channels selected from the available channels and a frequency hopping sequence to the terminals;

receiving data transmissions from the terminals using the communications protocol on channels of the set of channels and according to the frequency hopping sequence;

determining whether one or more of the terminals are suffering from interference on the channels of the frequency hopping sequence, and in response to determining that a number of interfered terminals is greater than a predetermined threshold, remove an interfered channel from the frequency hopping sequence; and sending a communication to at least one of the interfered terminals to modify a subsequent scheduled communication with the respective interfered terminals in response to determining that the number of interfered terminals is less than or equal to the predetermined threshold, wherein modifying the subsequent scheduled communications comprises at least one of allocating future communications with the respective one of the interfered terminals to time slots within the frequency hopping sequence that belong to a channel other than the interfered channel, or indicating, in advance, to the one of the interfered terminals that a future communication should be skipped.

17. The method of claim 16, wherein the available channels are determined according to available channels listed as available for by a whitespace database for a location of the base station; and the method further comprising generating the set of channels from the available channels and according to at least one of a power level associated with each of the available channels, detection of use of each of the available channels, and channel quality of each of the available channels.

* * * * *